United States Patent
Ashton et al.

(10) Patent No.: US 8,341,346 B2
(45) Date of Patent: Dec. 25, 2012

(54) OFFLOADING VOLUME SPACE RECLAMATION OPERATIONS TO VIRTUAL TAPE SYSTEMS

(75) Inventors: Lyn Lequam Ashton, Tucson, AZ (US); Thomas William Bish, Tucson, AZ (US); Stanley Mark Kissinger, Tucson, AZ (US); Jonathan Wayne Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 12/823,295

(22) Filed: Jun. 25, 2010

(65) Prior Publication Data
US 2011/0320679 A1   Dec. 29, 2011

(51) Int. Cl.
   *G06F 12/00*   (2006.01)
(52) U.S. Cl. ............... 711/111; 711/4; 711/165
(58) Field of Classification Search .............. 711/4, 111, 711/165
   See application file for complete search history.

(56) References Cited

U.S. PATENT DOCUMENTS

| | | | | |
|---|---|---|---|---|
| 6,304,880 | B1* | 10/2001 | Kishi | 1/1 |
| 6,675,257 | B1* | 1/2004 | Khalid et al. | 711/111 |
| 7,529,784 | B2* | 5/2009 | Kavuri et al. | 1/1 |
| 7,620,765 | B1 | 11/2009 | Ohr et al. | |
| 2001/0042222 | A1* | 11/2001 | Kedem et al. | 714/6 |
| 2002/0156968 | A1* | 10/2002 | Haustein | 711/111 |
| 2004/0177228 | A1* | 9/2004 | Leonhardt et al. | 711/170 |
| 2006/0294336 | A1* | 12/2006 | Gibble et al. | 711/171 |
| 2008/0243860 | A1* | 10/2008 | Cannon et al. | 707/10 |
| 2011/0010495 | A1* | 1/2011 | Haustein et al. | 711/111 |
| 2011/0107023 | A1* | 5/2011 | McCallister et al. | 711/111 |
| 2011/0225357 | A1* | 9/2011 | Kishi et al. | 711/111 |

* cited by examiner

*Primary Examiner* — John Lane
(74) *Attorney, Agent, or Firm* — Nelson and Nelson; Daniel P. Nelson; Alexis V. Nelson

(57) ABSTRACT

A method for offloading volume space reclamation operations to virtual tape systems is disclosed herein. In certain embodiments, such a method includes writing instruction information to a virtual tape system for use in performing a reclamation operation on a source virtual tape volume. The instruction information identifies the source virtual tape volume as well as valid objects in the source virtual tape volume. The virtual tape system then transforms the source virtual tape volume by retaining valid objects in the source virtual tape volume, removing invalid objects in the source virtual tape volume, and updating metadata associated with the source virtual tape volume to reflect changes made thereto. This generates an updated source virtual tape volume of reduced size. A corresponding computer program product and system are also disclosed and claimed herein.

25 Claims, 7 Drawing Sheets

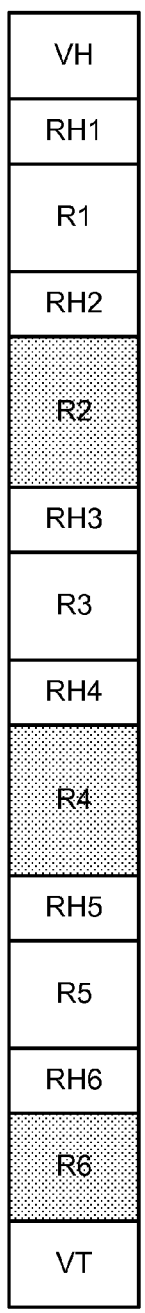
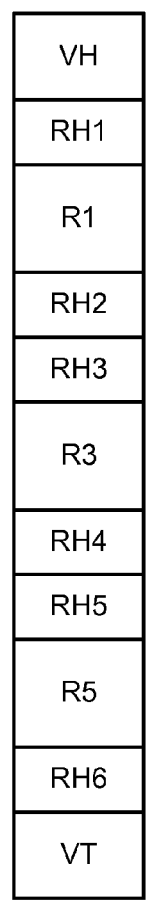
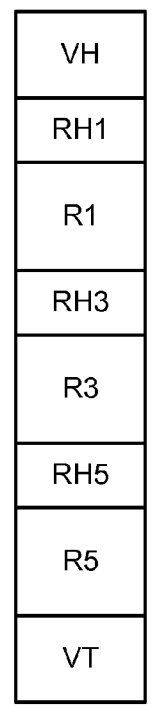
Fig. 5A
Fig. 5B
Fig. 5C

OFFLOADING VOLUME SPACE RECLAMATION OPERATIONS TO VIRTUAL TAPE SYSTEMS

BACKGROUND

1. Field of the Invention

This invention relates to systems, methods, and computer program products for offloading volume space reclamation operations to virtual tape systems.

2. Background of the Invention

There are various different applications on mainframe operating systems that store objects, such as datasets or files, on tape volumes. Examples include DFSMS (Data Facility System Managed Storage), HSM (Hierarchical Storage Management), DFSMS OAM (Object Access Method), and TSM (Tivoli Storage Manager). HSM and TSM are used to migrate objects from disk to tape or to make backup copies of objects. OAM places object data on tape volumes that may be a backup or original data. These applications typically utilize databases to keep track of object names, the tape volumes the objects are written to, how many tape records the objects contain, and the locations of the objects on the tape volumes. In certain cases, the locations of the objects may be recorded using the logical block ID returned by the tape subsystem.

Over a period of time, objects residing on a tape volume may no longer be needed or may be replaced by newer versions of the objects. The records for these objects may be deleted from an application's database. However, the objects may continue to occupy space on the tape volume. One of the characteristics of a tape volume is that data cannot be modified without overwriting data from the point of the modification to the end of the tape volume. Thus, data cannot be updated in place like it can be on disk-drive-based volumes. This results in tape volumes having certain parts of their capacity occupied by valid data and other parts occupied by invalid data.

Objects that are written to a tape volume may vary significantly as to how long they are valid. Some types of data, such as long term archival data, may never become invalid. Other types of data, such as data that is modified frequently, may leave previous invalid versions of the data distributed across one or more tape volumes. Thus, invalid objects may create significant amounts of wasted space on tape volumes.

Applications such as DFSMS HSM and TSM attempt to address this problem by employing a mechanism to recover the wasted space on tape volumes. This mechanism typically includes two elements. First, the application periodically determines if the valid data on a tape volume it manages has fallen below a specified threshold. This threshold may be a percentage of the amount of data the tape volume can hold when completely full. Second, if the valid data has fallen below the threshold, the application copies the still valid objects on the tape volume and writes them to a new tape volume, thereby making all data on the old tape volume invalid and allowing it to be overwritten with new data. The application then updates its database records to reflect that the valid objects reside on a new tape volume and to indicate where the records are located on the new tape volume. The database is also updated to reflect that the old tape volume has no active data and thus can be reused as "scratch."

The above-stated process is called "Recycle" on DFSMS HSM and "Reclamation" on TSM. Such a process (hereinafter generally referred to as a "reclamation process" or "reclamation operation") consumes significant resources on the host system. To perform the reclamation process, the host system needs to read the still valid data from a source tape volume and write the valid data out to a new tape volume. This consumes significant I/O bandwidth and CPU cycles. The reclamation process also requires two tape drives, making these drives unavailable for production use. The reclamation process further requires CPU cycles to update the application's database to reflect the new location of the valid objects. For many customers, the overhead of running the reclamation process can be significant and thus should not be run during periods of high host workload.

For a virtual tape system such as IBM's TS7720 or TS7740, the tape volume that an application sees is actually a file structure residing on a file system (referred to as a "virtual tape volume"). Disk drives provide the underlying storage for the file system. The control program within the virtual tape system virtualizes the underlying file structure so that the application sees standard tape records. As a result, an application cannot tell the difference between a real physical tape volume and a virtual tape volume presented by the virtual tape system. All aspects of a physical tape volume, including logical block IDs and positioning, are emulated for a virtual tape volume.

In view of the foregoing, what are needed are systems and methods to offload volume space reclamation operations to virtual tape systems. Ideally, such systems and methods will significantly reduce host overhead and resource utilization associated with the reclamation operations, thereby freeing up resources for production use. Further needed are systems and methods to perform reclamation operations without requiring a host application, such as HSM, to update its database.

SUMMARY

The invention has been developed in response to the present state of the art and, in particular, in response to the problems and needs in the art that have not yet been fully solved by currently available systems and methods. Accordingly, the invention has been developed to provide systems and methods for offloading volume space reclamation operations to virtual tape systems. The features and advantages of the invention will become more fully apparent from the following description and appended claims, or may be learned by practice of the invention as set forth hereinafter.

Consistent with the foregoing, a method for offloading volume space reclamation operations to virtual tape systems is disclosed herein. In certain embodiments, such a method includes writing instruction information to a virtual tape system for use in performing a reclamation operation on a source virtual tape volume. The instruction information identifies the source virtual tape volume as well as valid objects in the source virtual tape volume. The virtual tape system then transforms the source virtual tape volume by retaining valid objects in the source virtual tape volume, removing invalid objects in the source virtual tape volume, and updating metadata associated with the source virtual tape volume to reflect changes made thereto. This generates an updated source virtual tape volume of reduced size.

A corresponding computer program product and system are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 5A is a high-level block diagram showing one example of a virtual tape volume prior to performing a reclamation operation;

FIG. 5B is a high-level block diagram showing one example of the virtual tape volume of FIG. 5A after performing a reclamation operation;

FIG. 5C is a high-level block diagram showing another example of the virtual tape volume of FIG. 5A after performing a reclamation operation;

DETAILED DESCRIPTION

Figure 1:
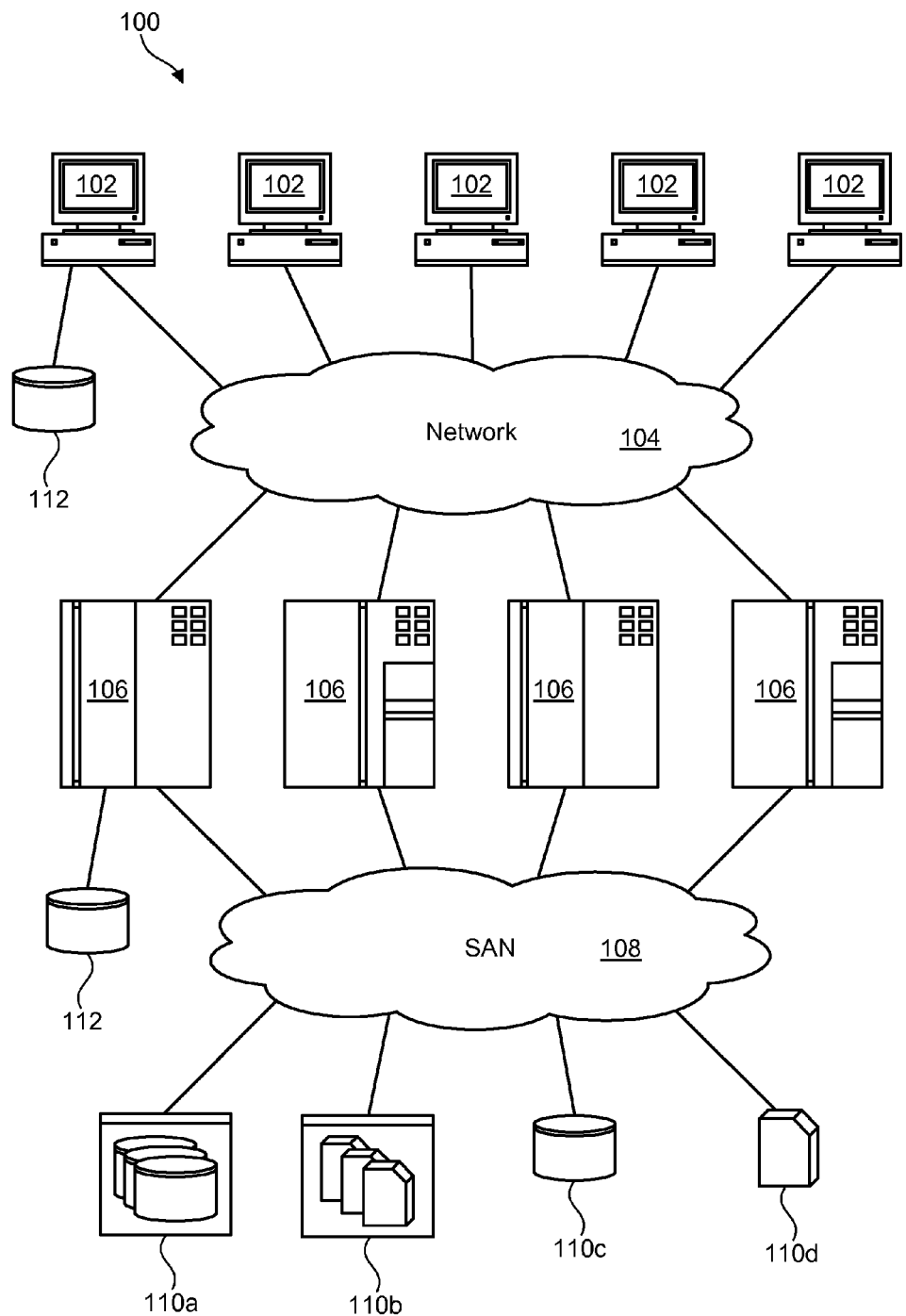
FIG. 1 is a high-level block diagram showing one example of a network architecture in which a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where a system and method in accordance with the invention may be implemented. The network architecture 100 is presented only by way of example and is not intended to be limiting. Indeed, the systems and methods disclosed herein may be applicable to a wide variety of different network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
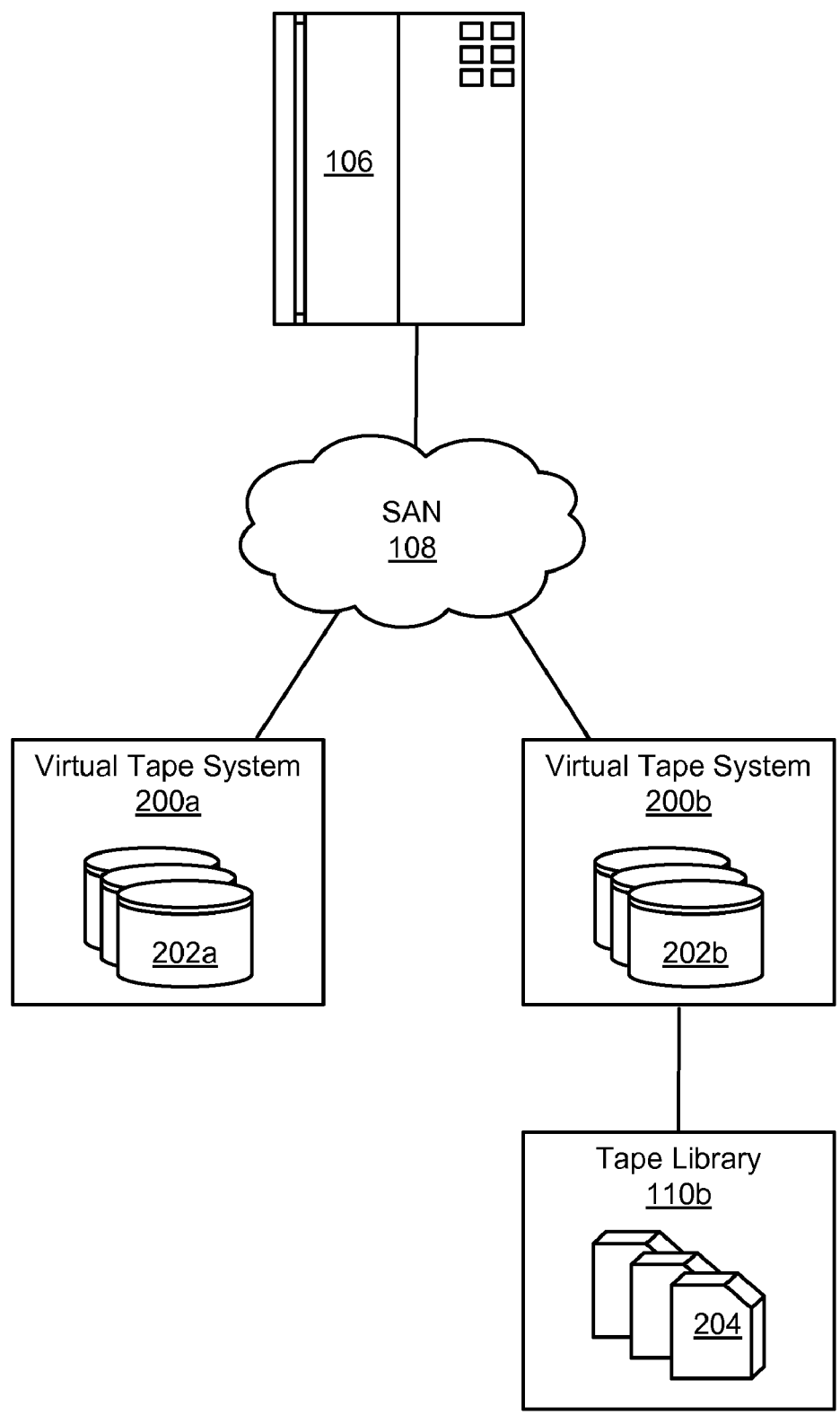
FIG. 2 is a high-level block diagram showing one example of a host system communicating with two different types of virtual tape systems.

Referring to FIG. 2, a high-level block diagram showing one example of a host system 106 communicating with two different types of virtual tape systems 200a, 200b is illustrated. The virtual tape systems 200a, 200b present emulated tape drives (also called "virtual tape drives") to the host system 106 and store tape data on emulated tape volumes (hereinafter referred to as "virtual tape volumes") in disk-based cache 202a, 202b as opposed to on physical tape media 204. To the host system 106, the emulated tape drives may look exactly the same as physical tape drives. Emulation may be transparent to the host system 106 as well as applications running on the host system 106.

Data that is stored on the disk-based cache 202 may be transferred to physical tape 204. Thus, a virtual tape system 200b may communicate with physical tape drives in a tape library 110b or other tape storage device. Nevertheless, the host system 106 may exclusively read and write to virtual tape drives in the virtual tape system 200b. The host system 106 may not be aware that the physical tape exists. One example of a virtual tape system 200b similar to that illustrated in FIG. 2 is the IBM TS7740 virtual tape system, although it is not limited to such. In other embodiments, a virtual tape system 200a has no physical tape drives for back-end processing. One example of a virtual tape system 200a similar to that illustrated in FIG. 2 is the IBM TS7720 virtual tape system, although it is not limited to such.

To enable a host system 106 to access a virtual tape volume that resides in the disk-based cache 202, the virtual tape volume may be virtually mounted (as opposed to physically mounted). Once the virtual mount is complete, the host system 106 may access data in the virtual tape volume at disk speed. Once access to the data is finished, the virtual tape volume may be closed and virtually demounted. The virtual tape volume may be optionally migrated from the disk-based cache 202 to physical tape 204 either immediately or at a later time. When the virtual tape volume is migrated, the virtual tape volume becomes a logical volume written to a physical tape volume. Multiple logical volumes may be written to each physical tape volume, a process that may be referred to as "stacking." A physical tape volume that contains multiple logical volumes may be referred to as a "stacked volume." The virtual tape system 200b may manage the physical tape drives and physical tape volumes in the tape library 110b and control the movement of data between the virtual tape volumes in the disk-based cache 202b and the physical tape volumes in the tape library 110b.

Figure 3:
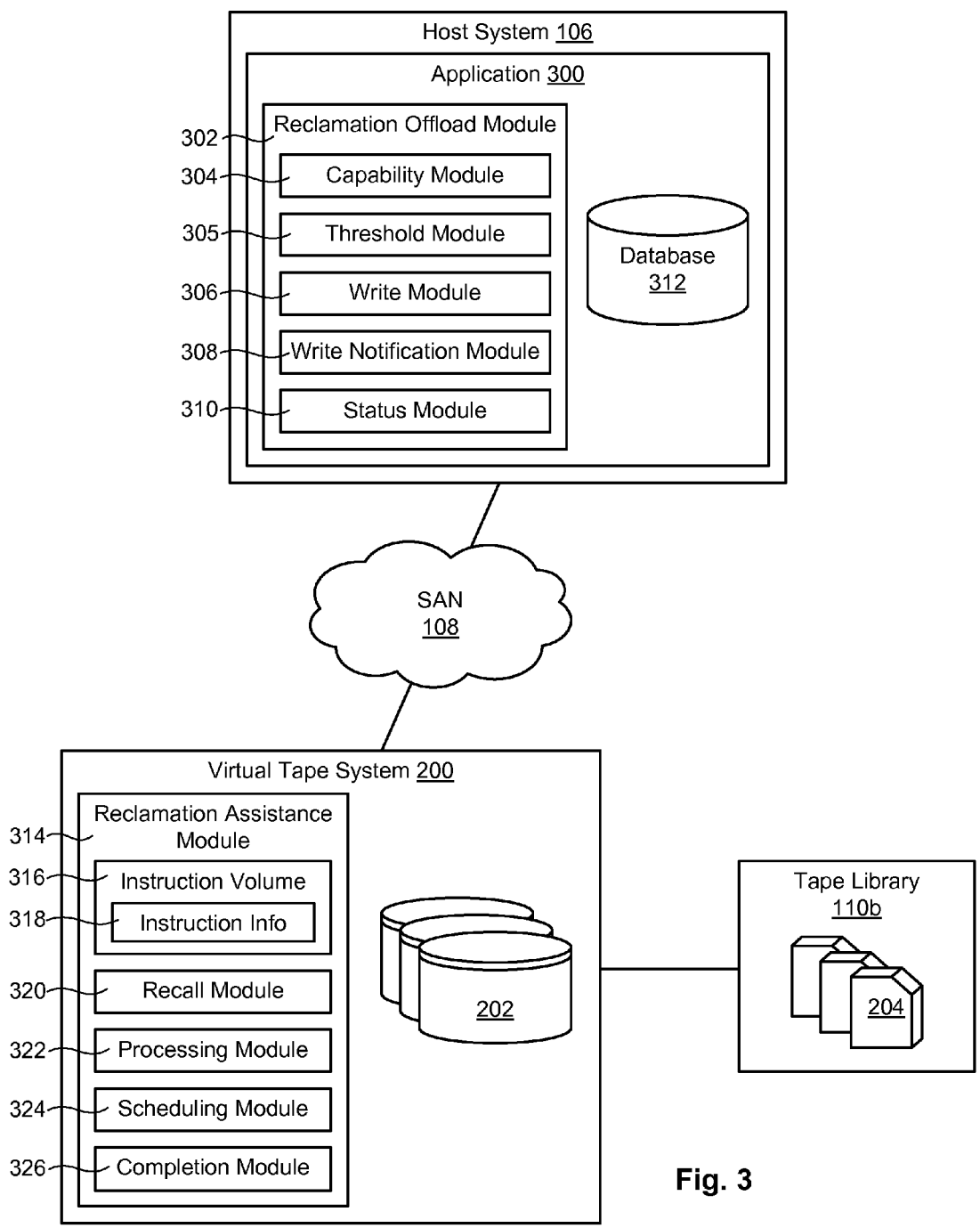
FIG. 3 is a high-level block diagram showing one example of modules that may be included in a host system and virtual tape system to perform a reclamation operation on a tape volume.

Referring to FIG. 3, as previously mentioned, over a period of time, certain objects (e.g., datasets, files, etc.) residing on logical volumes on physical tape, or on virtual tape volumes in the disk-based cache 202, may no longer be needed or may be replaced by newer versions of the objects. Records for these objects may be deleted from an application's database 312. However, the objects may continue to occupy space in the virtual tape volumes. As previously mentioned, one of the characteristics of a physical tape volume is that data cannot be modified without overwriting data from the point of the modification to the end of the tape volume. Thus, data cannot be updated in place like it can be on disk-based volumes. This results in tape volumes having parts of their capacity occupied by valid data and other parts occupied by invalid data. As previously mentioned, conventional applications such as DFSMS HSM and TSM attempt to address this problem using volume space reclamation operations. Such operations typically execute on the host system 106 and undesirably consume significant I/O bandwidth and CPU cycles.

In selected embodiments in accordance with the invention, much of the overhead of the volume space reclamation process may be offloaded to a virtual tape system 200 in order to conserve I/O bandwidth and CPU cycles on the host system 106. This may be accomplished by incorporating additional functionality into the host system 106 and the virtual tape system 200. As shown in FIG. 3, in selected embodiments, the functionality of an application 300 (such as DFSMS HSM or TSM, for example) running on a host system 106 may be augmented to include a reclamation offload module 302. Similarly, the functionality of a virtual tape system 200 may be augmented to include a reclamation assistance module 314. These two modules 302, 314 together may enable much of the overhead of the volume space reclamation operation to be offloaded to the virtual tape system 200.

In certain embodiments, the reclamation offload module 302 may include one or more of a capability module 304, a threshold module 305, a write module 306, a write notification module 308, and a status module 310.

The capability module 304 may be configured to determine whether a virtual tape system 200 is capable of assisting in a volume space reclamation operation (i.e., determine whether the virtual tape system 200 is configured with a reclamation assistance module 314). If the virtual tape system 200 is a TS7720, TS7740, or other similar virtual tape system 200, the capability module 304 may learn about the capabilities of the virtual tape system 200 through the Read Device Characteristics command (a command used by zSeries hosts to ESCON/FICON attached devices). The host system 106 may issue this command to a virtual tape drive as it is varied online to the host system 106. The host system 106 may then include this information in a control block that may be accessed by applications 300. Thus, the Read Device Characteristics command may be used to determine whether the virtual tape system 200 is configured with the reclamation assistance module 314 and can assist with the volume space reclamation process. Alternatively, the capability module 304 may learn of this capability from data returned in response to the Perform Library Function—Library Data command (another command used by zSeries hosts to ESCON/FICON attached devices). This command is also issued to a virtual tape drive as it is varied online to the host system 106. Other techniques for learning the capabilities of the virtual tape system 200 are also possible and within the scope of the invention.

A threshold module 305 may be provided to periodically determine if the valid data residing on a tape volume has fallen below a specified threshold. In certain embodiments, this threshold may be a percentage of the amount of data the tape volume can hold when completely full. If the valid data has fallen below the threshold, a write module 306 may write instruction information 318 to an instruction volume 316 in the virtual tape system 200. This instruction information 318 may include, for example, the identity of the tape volume that has fallen below the threshold, version information for the format of the records in the tape volume, the number of valid objects in the tape volume, the logical block ID that each valid object starts on, the number of records in each valid object, the name of each valid object, and the like. A write notification module 308 may then notify the virtual tape system 200 that instruction information 318 has been written to the instruction volume 316. This may enable (or instruct) the reclamation assistance module 314 to begin execution of the reclamation process. Once the reclamation operation has completed, a status module 310 may determine the status of the process. For example, the status module 310 may determine whether the reclamation process completed successfully (i.e., whether all valid objects in the tape volume were processed successfully). In certain embodiments, the status module 310 may determine the status by reading status information written to the instruction volume 316 by the reclamation assistance module 314 when the reclamation operation has completed.

In selected embodiments, the reclamation assistance module 314 may include one or more of a recall module 320, a processing module 322, a scheduling module 324, and a completion module 326. A recall module 320 may be configured to recall logical volumes from the tape library 110b (i.e., copy logical volumes from the tape library 110b to the disk-based cache 202) in the event the reclamation assistance module 314 needs to execute the reclamation operation on the logical volumes. In certain embodiments, the recall module 320 may recall logical volumes solely for the purpose of executing the reclamation operation thereon. In other embodiments, the recall module 320 may wait until the logical volumes need to be recalled for other reasons (e.g., access by the host system 106). When a logical volume is recalled to the disk-based cache 202, the logical volume becomes a virtual tape volume.

In certain embodiments, the threshold module 305 may be configured to evaluate a tape volume (i.e., determine whether a threshold has been reached to warrant executing the space reclamation operation) when the tape volume is recalled from physical tape. Since the tape volume will reside in the disk-based cache 202 after the recall, the recall module 320 will not need to recall the tape volume exclusively for the purpose of executing the reclamation operation thereon. This may improve the efficiency of the reclamation assistance module 314.

A processing module 322 may be used to perform the reclamation operation on the tape volume that is identified in the instruction information 318. One example of how the reclamation operation may be performed will be described in association with FIG. 4. In general, the processing module 322 removes invalid objects from the virtual tape volume while preserving valid objects to reduce the size of the virtual tape volume. Once the reclamation operation has been performed on the virtual tape volume, a completion module 326 may notify the reclamation offload module 302 that the reclamation process is complete. The completion module 326 may also write status information to the instruction volume 316. This status information may be read by the status module 310 to determine the status of the reclamation operation.

In selected embodiments, a scheduling module 324 may schedule the operation of the processing module 322. For example, in certain embodiments, the scheduling module 324 may schedule the reclamation operation to execute immediately upon receiving a notification from the write notification module 308 (indicating that instruction information 318 has been written to the instruction volume 316). In other embodiments, the scheduling module 324 may schedule the reclamation operation to execute during periods of reduced activity on the virtual tape system 200. In yet other embodiments, the scheduling module 324 may schedule the reclamation operation to execute in specified time windows. Other methods for scheduling the reclamation operation are possible and within the scope of the invention.

The modules illustrated in FIG. 3 may be implemented in hardware, software or firmware executable on hardware, or a combination thereof. The modules are presented only by way of example and are not intended to be limiting. Indeed, alternative embodiments may include more or fewer modules than those illustrated. Furthermore, in some embodiments, the functionality of some modules may be broken into multiple modules or, conversely, the functionality of several modules may be combined into a single module or fewer modules. It should also be recognized that the modules are not necessarily implemented in the locations where they are illustrated. For example, in certain embodiments, some functionality shown in the host system 106 may be implemented all or in part in the virtual tape system 200 and vice versa. Thus, the location of the modules is presented only by way of example and is not intended to be limiting.

Figure 4:
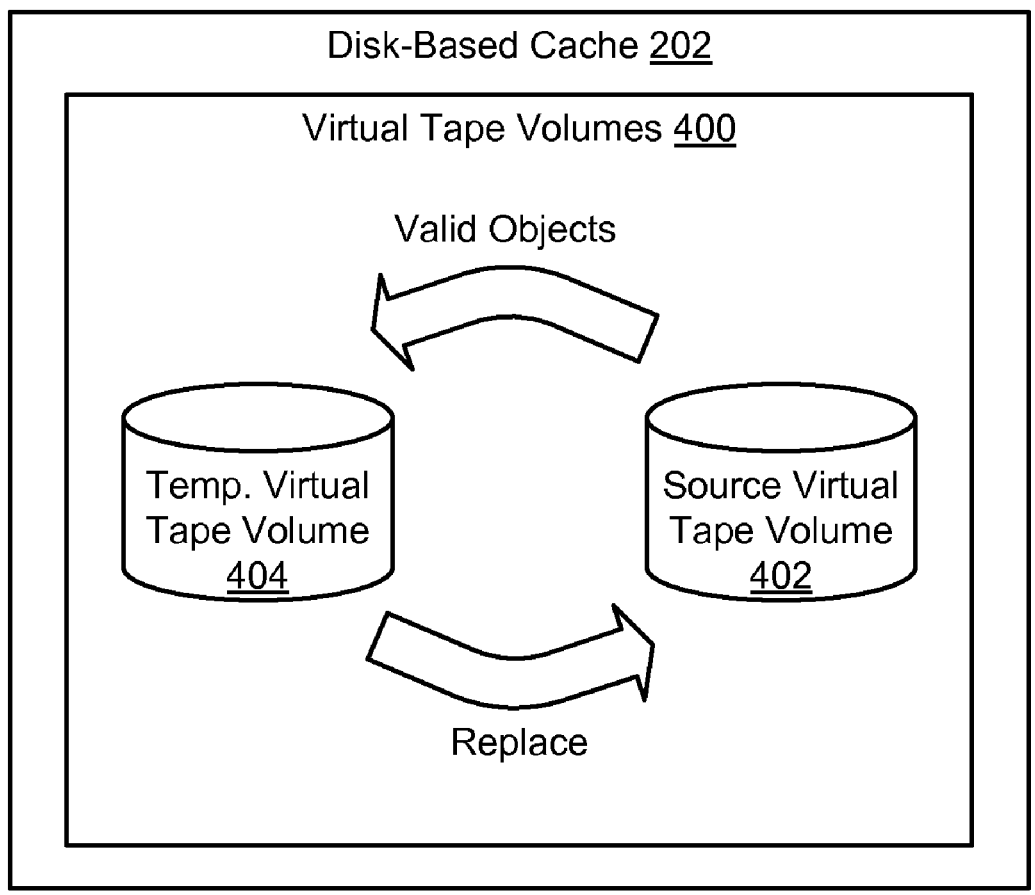
FIG. 4 is a high-level block diagram showing one example of how a reclamation operation may be performed on a source virtual tape volume residing in disk-based cache.

Referring to FIG. 4, a high-level block diagram showing one example of how the reclamation process may be performed on a virtual tape volume is illustrated. The reclamation operation may be performed by the processing module 322 as previously discussed. As shown, to perform the reclamation operation on a virtual tape volume 402 (hereinafter referred to as a "source virtual tape volume" 402), a temporary virtual tape volume 404 may be created to receive the output of the reclamation operation. The temporary virtual tape volume 404 may be used to ensure that if the reclamation operation is interrupted by a power outage, failure, or other event, no data will be lost. Once the temporary virtual tape volume 404 is created, valid objects may be copied from the source virtual tape volume 402 to the temporary virtual tape volume 404, while omitting invalid objects. The valid objects may be placed adjacent to one another to reclaim wasted space therebetween. When performing the reclamation operation, the apparent location of each object in the temporary virtual tape volume 404 as identified by its logical block ID is maintained.

In selected embodiments, invalid object records in the source virtual tape volume 402 may be deleted completely. In other embodiments, headers for the invalid object records may be written to the temporary virtual tape volume 404, except that the object record length indicators in the headers may be reduced to zero to indicate that the data in the objects has been removed. Once all valid objects in the source virtual tape volume 402 have been copied to the temporary virtual tape volume 404, the source virtual tape volume 402 may be replaced by the temporary virtual tape volume 404. In this way, the source virtual tape volume 402 is "transformed" (i.e., by deleting invalid objects and updating the volume metadata in order to reclaim wasted space) to create an updated source virtual tape volume 402 of reduced size. Because the location information (tape volume and logical block ID) for each object in the updated source virtual tape volume 402 has not changed, the application database 312 does not need to be updated. This reduces CPU cycles on the host system 106.

It should be recognized that although a temporary virtual tape volume 404 is used in this embodiment to ensure that no data will be lost if the reclamation operation is interrupted by a power outage, failure, or other event, the temporary virtual tape volume 404 may not be necessary in all embodiments. In other embodiments, the source virtual tape volume 402 may be "transformed" in place. That is, the source virtual tape volume 402 may be directly overwritten with an updated source virtual tape volume 402 that retains valid objects and omits invalid objects.

Offloading the reclamation operation to the virtual tape system 200 may provide one or more benefits. First, it may significantly reduce host overhead (e.g., CPU cycles) and resources (e.g., I/O bandwidth and virtual tape drives) needed to perform the reclamation operation. This means that these resources are available for production use by different applications 300. Second, since the logical block IDs for objects may be maintained through the process, an application 300 may not need to update its database 312 with updated location information. From the application's perspective, the objects may still be located on the same tape volume and have the same logical block ID position. This can significantly reduce the amount of time and resources required to perform a reclamation operation on a tape volume.

Referring to FIG. 5A, one example of a virtual tape volume 500 prior to performing a volume space reclamation operation is illustrated. As shown, the virtual tape volume 500 includes a volume header (VH), one or more records (R1, R2, . . . , R6), one or more record headers (RH1, RH2, . . . , RH6), and a volume trailer (VT). An object (e.g., a dataset, file, etc.) may be made up of one or more records. The volume header (VH) and volume trailer (VT) store metadata about the records in the virtual tape volume 500, including, for example, the volume name, the volume serial number, the number of records in the volume, the size of the records in the volume, the location of the records in the volume, and so forth, among other information. Each record header (RH) stores metadata associated with a specific record (R), such as the record block ID, the record length, and so forth, among other information.

Assume, for the purposes of this example, that the even records (R2, R4, and R6) contain invalid data and thus create wasted space in the volume 500. These records will be removed from the volume 500 upon performing a reclamation operation on the volume 500. As was previously mentioned above, there are at least two options for removing the invalid records from the volume 500. The first and more preferred option is to remove the records but leave the associated headers in place. The record length indicator in these headers may be reduced to zero to reflect that the data in these records has been removed. The metadata in the volume header (VH) and/or volume trailer (VT) may be updated to reflect the new virtual tape volume size and new locations of the valid records in the reorganized volume 500. The resulting reorganized volume 500 using the first option is illustrated generally in FIG. 5B. The other option is to remove both the headers and data for invalid records. Like the previous example, the metadata in the volume header (VH) and/or volume trailer (VT) may be updated to reflect the new virtual tape volume size and new locations of the valid records in the reorganized volume 500. The resulting reorganized volume 500 using the second option is shown in FIG. 5C.

Figure 6:
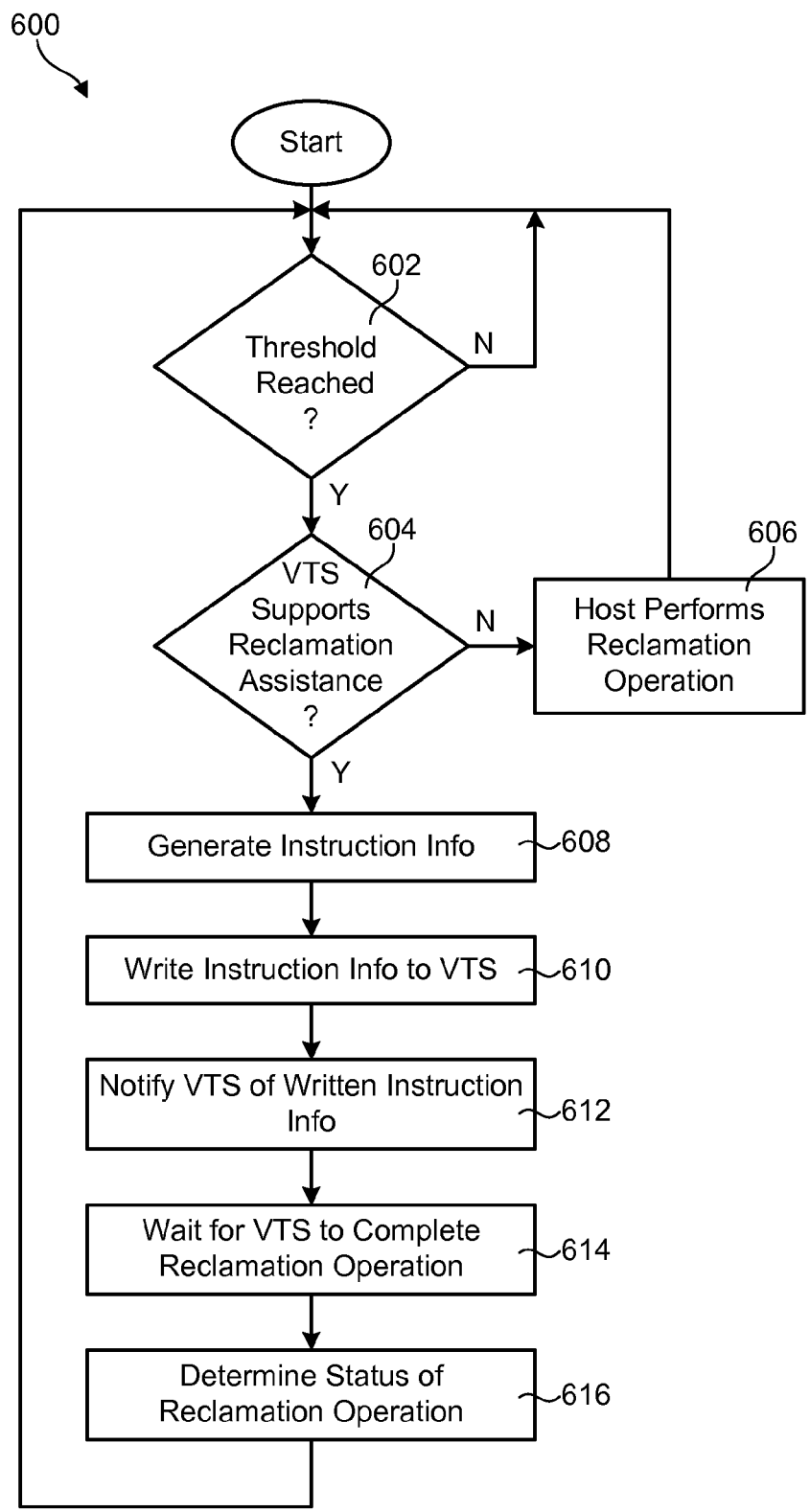
FIG. 6 is a flow chart showing one example of a method for performing a reclamation operation from the perspective of the host system.

Referring to FIG. 6, one embodiment of a method 600 for performing the reclamation operation from the perspective of a host system 106 is illustrated. As shown, a host system 106 initially determines 602 whether a threshold has been reached (indicating whether a reclamation operation should be performed on a tape volume). If the threshold has been reached, the host system 106 determines 604 whether the virtual tape system 200 on which the tape volume resides supports reclamation assistance (i.e., is programmed with a reclamation assistance module 314).

If the virtual tape system 200 does not support reclamation assistance, the host system 106 (and more specifically the application 300 in the host system 106) may perform the reclamation operation on its own. The application 300 may accomplish this, for example, by copying the still valid objects on the selected tape volume and writing them to a new tape volume. The application may then update its database 312 to indicate that the valid objects reside on a new tape volume and where the new tape volume is located. As previously mentioned, performing the reclamation operation in this manner may consume CPU cycles and I/O bandwidth between the host system 106 and the virtual tape system 200. This operation may also occupy two virtual tape devices, making the devices unavailable for production use.

If, on the other hand, the virtual tape system 200 supports reclamation assistance, the host system 106 generates 608 instruction information 318 that identifies the tape volume that needs space reclamation well as the objects in the tape volume that are still valid. The host system 106 may then write 610 the instruction information to the virtual tape system 200, such as by writing the instruction information 318 to an instruction volume 316. Alternatively, the host system 106 may simply send the instruction information 318 to the virtual tape system 200 and the virtual tape system 200 may write the instruction information 318 to an internal memory or volume. Once the instruction information 318 is written 610, the host system 106 may notify 612 the virtual tape system 200 that the instruction information 318 has been written. In certain embodiments, the host system 106 notifies the virtual tape system 200 by sending a message. In other embodiments, the virtual tape system 200 could itself detect that the instruction information 318 has been written and thereby initiate the reclamation operation on its own.

The host system 106 may then wait 614 for the reclamation operation to be performed by the virtual tape system 200. In selected embodiments, upon completing the reclamation operation, the virtual tape system 200 saves status information in the instruction volume 316 and notifies the host system 106 when it has completed the reclamation operation. The host system 106 may then determine 616 the status of the reclamation operation by simply reading the status information in the instruction volume 316. Alternatively, the virtual tape system 200 could send the status information directly to the host system 106. Various modification to the method 600 are possible and within the scope of the invention.

Figure 7:
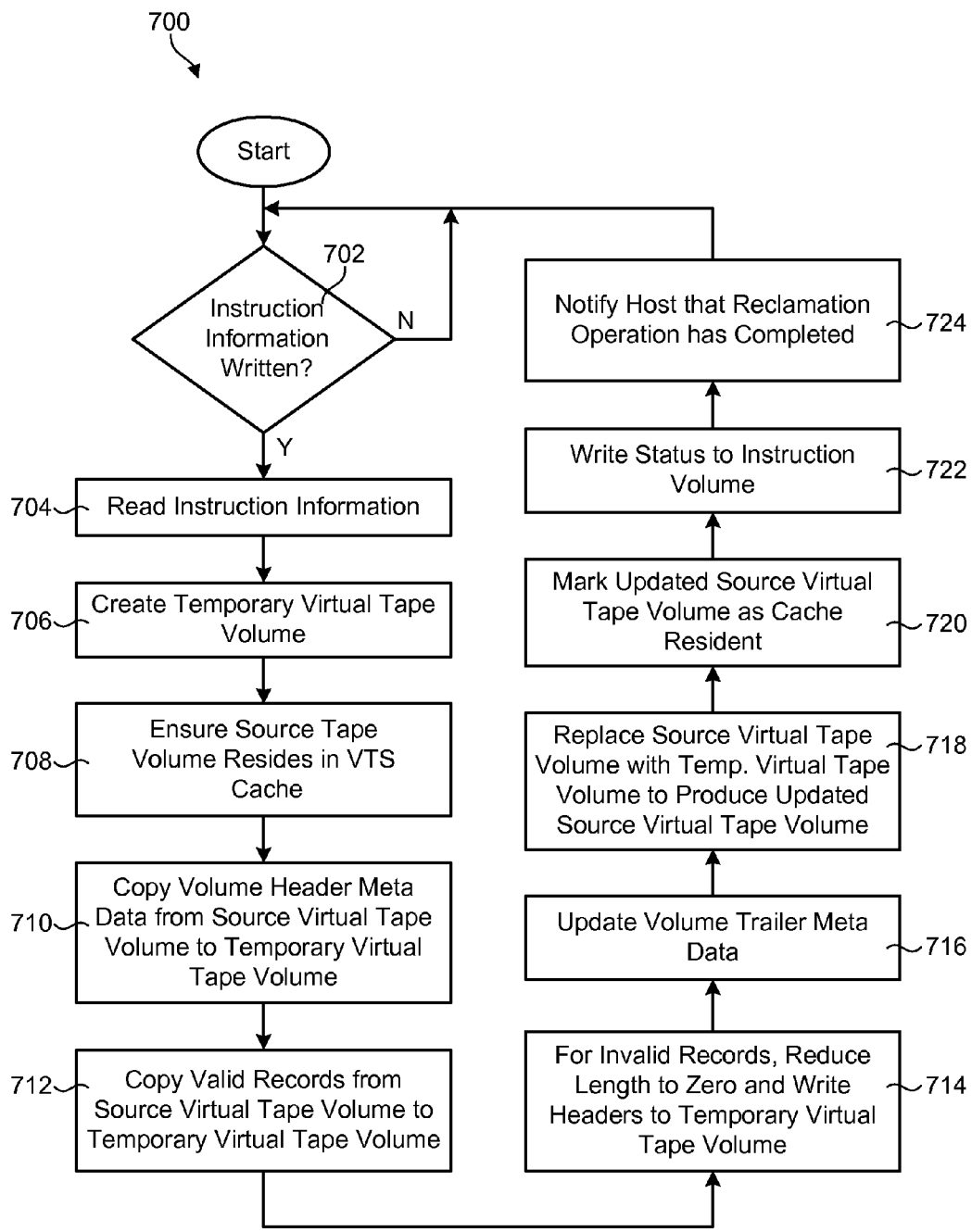
FIG. 7 is a flow chart showing one example of a method for performing a reclamation operation from the perspective of the virtual tape system.

Referring to FIG. 7, one embodiment of a method 700 for performing the reclamation operation from the perspective of a virtual tape system 200 is illustrated. As shown, the virtual tape system 200 initially determines 702 whether instruction information 318 has been written to the virtual tape system 200. If instruction information 318 has been written, the virtual tape system 200 reads 704 the instruction information 318 and verifies that the virtual tape system 200 supports the record format of the virtual tape volume identified in the instruction information 318. If the virtual tape system 200 supports the format, the virtual tape system 200 creates 706 a temporary virtual tape volume 404. The virtual tape system 200 also ensures 708 that the source virtual tape volume resides in the disk-based cache 202. If not, the virtual tape system 200 recalls the source logical tape volume from physical tape, thereby generating a source virtual tape volume 402. The virtual tape system 200 may then copy 710 the volume header metadata from the source virtual tape volume 402 to the temporary virtual tape volume 404.

At this point, the virtual tape system 200 may copy 712 the valid records from the source virtual tape volume 402 to the temporary virtual tape volume 404. The logical block ID contained in the metadata associated with the valid records may be maintained. For invalid records, the virtual tape system 200 modifies the record headers to reduce the record length to zero and writes 714 the headers to the temporary virtual tape volume 404 with the updated length information. The logical block IDs in the metadata associated with the invalid tape records may be preserved so that the sequential nature of logical block IDs is maintained for the temporary volume. The virtual tape system 200 may then update 716 the volume trailer metadata to reflect the new locations of the valid records in the reorganized volume.

At this point, the virtual tape system 200 may replace 718 the source virtual tape volume 402 with the temporary virtual tape volume 404 to produce an updated source virtual tape volume 402. The virtual tape system 200 may then mark 720 the updated source virtual tape volume 402 as cache resident, meaning that it may need to be copied to physical tape (if physical tape exists) and/or copied to peer virtual tape systems if the virtual tape system 200 is part of a peer-to-peer grid system (where multiple virtual tape systems 200 store redundant copies of the same data). The virtual tape system 200 may then write 722 status information to the instruction volume 316 and notify 724 the host system 106 that the reclamation operation has completed. Various modification to the method 700 are possible and within the scope of the invention.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for offloading a volume space reclamation operation to a virtual tape system, the method comprising:
    writing instruction information to a virtual tape system, the instruction information identifying a source virtual tape volume and objects in the source virtual tape volume that are valid; and
    transforming, by the virtual tape system, the source virtual tape volume by retaining valid objects in the source virtual tape volume, removing invalid objects in the source virtual tape volume, and updating metadata associated with the source virtual tape volume to reflect changes made to the source virtual tape volume, thereby generating an updated source virtual tape volume of reduced size.

2. The method of claim 1, wherein transforming the source virtual tape volume further comprises:
    copying the valid objects in the source virtual tape volume to a temporary virtual tape volume, while omitting invalid objects; and
    replacing the source virtual tape volume with the temporary virtual tape volume to generate the updated source virtual tape volume.

3. The method of claim 2, wherein omitting the invalid objects comprises one of:
    (a) omitting both headers and data associated with the invalid objects; and
    (b) omitting data associated with the invalid objects while retaining headers associated with the invalid objects.

4. The method of claim 3, wherein retaining headers associated with the invalid objects further comprises reducing length indicators in the headers to zero to indicate that the data in the invalid objects has been removed.

5. The method of claim 2, further comprising storing the source virtual tape volume and the temporary virtual tape volume in disk-based cache while the transformation is performed.

6. The method of claim 5, further comprising recalling the source virtual tape volume from physical tape prior to performing the transformation.

7. The method of claim 1, further comprising writing the updated source virtual tape volume to physical tape.

8. The method of claim 1, wherein logical block IDs for the valid objects prior to the transformation are the same after the transformation.

9. A computer program product for offloading a volume space reclamation operation to a virtual tape system, the computer program product comprising a non-transitory computer-readable storage medium having computer-usable program code embodied therein, the computer-usable program code comprising:
    computer-usable program code to write instruction information to a virtual tape system, the instruction information identifying a source virtual tape volume and objects in the source virtual tape volume that are valid; and
    computer-usable program code to transform the source virtual tape volume by retaining valid objects in the source virtual tape volume, removing invalid objects in the source virtual tape volume, and updating metadata associated with the source virtual tape volume to reflect changes made to the source virtual tape volume, thereby generating an updated source virtual tape volume of reduced size.

10. The computer program product of claim 9, wherein transforming the source virtual tape volume further comprises:
    copying the valid objects in the source virtual tape volume to a temporary virtual tape volume, while omitting invalid objects; and
    replacing the source virtual tape volume with the temporary virtual tape volume to generate the updated source virtual tape volume.

11. The computer program product of claim 10, wherein omitting invalid objects comprises one of:
    (a) omitting both headers and data associated with the invalid objects; and
    (b) omitting data associated with the invalid objects while retaining headers associated with the invalid objects.

12. The computer program product of claim 11, wherein retaining headers associated with the invalid objects further comprises reducing length indicators in the headers to zero to indicate that the data in the invalid objects has been omitted.

13. The computer program product of claim 9, further comprising computer-usable program code to write the updated source virtual tape volume to physical tape.

14. The computer program product of claim 9, further comprising computer-usable program code to determine, prior to writing the instruction information to the virtual tape system, whether the virtual tape system is capable of assisting in a volume space reclamation operation.

15. The computer program product of claim 9, further comprising computer-usable program code to store the source virtual tape volume and the temporary virtual tape volume in disk-based cache while the transformation is performed.

16. The computer program product of claim 15, further comprising computer-usable program code to recall the source virtual tape volume from physical tape prior to performing the transformation.

17. A system for offloading a volume space reclamation operation to a virtual tape system, the system comprising:
    a write module to write instruction information to a virtual tape system, the instruction information identifying a source virtual tape volume and objects in the source virtual tape volume that are valid; and
    a processing module to transform the source virtual tape volume by retaining valid objects in the source virtual tape volume, removing invalid objects in the source virtual tape volume, and updating metadata associated with the source virtual tape volume to reflect changes made to the source virtual tape volume, thereby generating an updated source virtual tape volume of reduced size.

18. The system of claim 17, wherein the processing module is further configured to:
    copy the valid objects in the source virtual tape volume to a temporary virtual tape volume, while omitting invalid objects; and
    replace the source virtual tape volume with the temporary virtual tape volume to generate the updated source virtual tape volume.

19. The system of claim 18, wherein omitting the invalid objects comprises one of:
    (a) omitting both headers and data associated with the invalid objects; and
    (b) omitting data associated with the invalid objects while retaining headers associated with the invalid objects.

20. The system of claim 19, wherein the processing module is further configured to reduce length indicators in the headers to zero to indicate that the data associated with the invalid objects has been omitted.

21. The system of claim 17, further comprising a capability module to determine, prior to writing the instruction information to the virtual tape system, whether the virtual tape system is capable of assisting in a volume space reclamation operation.

22. The system of claim 17, further comprising a recall module to recall the source virtual tape volume from physical tape prior to performing the transformation.

23. A system for offloading a volume space reclamation operation to a virtual tape system, the system comprising:
    a host system further configured to write instruction information to a virtual tape system, the instruction information identifying a source virtual tape volume and objects in the source virtual tape volume that are valid; and
    the virtual tape system configured to transform the source virtual tape volume by retaining valid objects in the source virtual tape volume, removing invalid objects in the source virtual tape volume, and updating metadata associated with the source virtual tape volume to reflect changes made to the source virtual tape volume, thereby generating an updated source virtual tape volume of reduced size, wherein logical block IDs for the valid objects prior to the transformation are the same after the transformation.

24. The system of claim 23, wherein the virtual tape system is further configured to:
    copy the valid objects in the source virtual tape volume to a temporary virtual tape volume, while omitting invalid objects; and
    replace the source virtual tape volume with the temporary virtual tape volume to generate the updated source virtual tape volume.

25. The system of claim 24, wherein omitting the invalid objects comprises one of:
    (a) omitting both headers and data associated with the invalid objects; and
    (b) omitting data associated with the invalid objects while retaining headers associated with the invalid objects.

* * * * *